Dec. 8, 1953   H. H. KEEN   2,661,685
CARD CONTROLLED PRINTING MACHINE
Filed April 14, 1949   8 Sheets-Sheet 2

INVENTOR
*HAROLD HALL KEEN*
BY
ATTORNEY

Dec. 8, 1953

H. H. KEEN 2,661,685

CARD CONTROLLED PRINTING MACHINE

Filed April 14, 1949

INVENTOR
HAROLD HALL KEEN

BY Ralph C. Dustin

ATTORNEY

INVENTOR
HAROLD HALL KEEN

Patented Dec. 8, 1953

2,661,685

UNITED STATES PATENT OFFICE 2,661,685

CARD CONTROLLED PRINTING MACHINE

Harold Hall Keen, Letchworth, England, assignor to International Business Machines Corporation, New York, N. Y., a corporation of New York Application April 14, 1949, Serial No. 87,508

9 Claims. (Cl. 101—93)

This invention relates to record card controlled machines in which data derived from a card is printed upon a record card. This type of machine is generally known in the art as an interpreter.

There is described in U. S. Patent No. 2,076,713 a machine of the above mentioned type in which data punched on a record card is printed upon the top edge of the same card. By means of a manually operated adjustment, printing may be arranged to take place on either one of two possible line positions. Since the data is printed upon the data bearing card, only one card feed and one sensing station are employed.

It has been proposed in the U. S. Patent No. 2,424,076 to employ an interpreter comprising two card feeds and two sensing stations, the data from the two punched cards at the sensing stations being compared, and the result of the comparison being used to control printing on to the master card of data derived from the master card, or from detail cards or from both types of cards. The feed of the master card to successive line printing positions is governed by a series of stops, which may be controlled by a designation punching on the detail cards.

The object of the present invention is to print data derived from a group of punched record cards on to a blank record card, the data being printed on preselected lines on the blank record cards, without the use of card stops for line positioning. A group is to be deemed to include a single card group.

Another object of the invention is to provide a line positioning means which may be adjusted to cause the first line to be printed on the blank card at any one of a number of preselected positions and thereafter to continue to print successive lines at any one of a number of preselected spacings.

According to the invention, an interpreter for printing data derived from record cards on to unpunched record cards, having primary feed rolls and sensing means for data bearing cards, and secondary feed rolls for cards to be printed upon, has presettable means for adjusting the timing of the entry of the unpunched record cards into the secondary feed rolls relative to the timing of the entry of the data bearing records into the primary feed rolls, so that data read from one punched card may be interpreted upon another card at a presettable line position.

It is, therefore, preferred to arrange the machine so that it may (a) interpret cards in a normal manner; (b) reproduce data from one card on to a single blank card at any predetermined line, or (c) reproduce a succession of cards forming groups so that each group is reproduced on a card on successive lines commencing at any predetermined line.

Other objects of the invention will be pointed out in the following description and claims and illustrated in the accompanying drawings, which disclose, by way of example, the principle of the invention and the best mode, which has been contemplated, of applying that principle.

The invention will be described as applied to a machine of the type shown in the U. S. Patent No. 2,076,713. In the interests of conciseness this patent will be used as a reference patent, and to this end parts common to the machine described in the patent and to the machine constructed according to the present invention will be similarly referenced. The present machine comprises, among other parts, two card feeding and sensing arrangements very similar to the one shown and described in the reference patent, and the duplicated parts of the mechanism will be designated by corresponding reference numerals, with the numerals of one set followed by the letter a. A general description of the features common to the two machines will now be given and resort may be had to the reference patent for a more detailed description.

Figure 1:
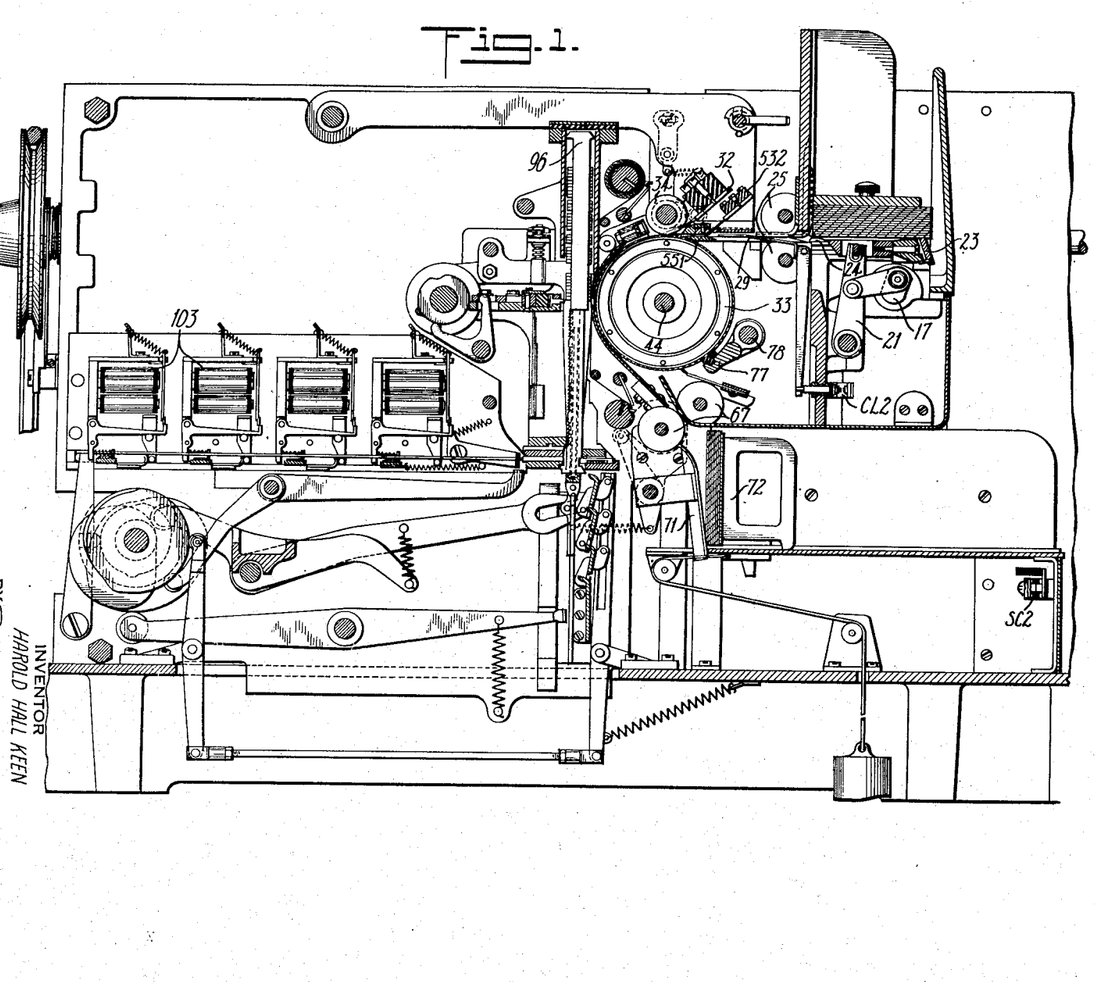
Figs. 1 and 1a, taken together, constitute a central vertical section of the complete machine.
Figure 1A:
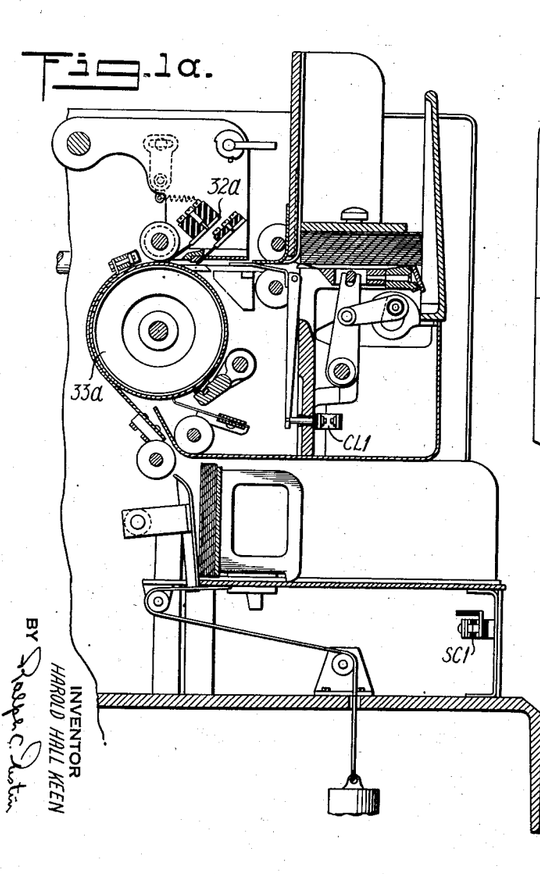

From Figs. 1 and 1a it will be seen that the machine comprises two sensing and feeding arrangements for handling two separate packs of cards. The left-hand or secondary feeding mechanism has associated with it a suitable mechanism for printing on cards.

The picker knife 23 is reciprocated by arm 21 to feed cards forward through the throat block 24 and into the grip of feed rolls 25. The card in feeding forward depresses the end of a card lever 29 which rocks to close contacts CL2. The card then feeds forward between a set of advance sensing brushes 532 and a contact plate 551, and a set of reading brushes 32 and a contact drum 33, feeding being effected by the combined action of the drum 33 and the feed roll 34. In the operation of the machine, in accordance with the invention, the cards in this feed will be blank cards and, in consequence, the sensing brushes 32 and 532 will not be connected up. The sensing brushes are provided, however, so that, if desired, punched cards may be placed in this feed and interpreted in the normal way, that is, the data is printed on the card from which it is derived.

The rotation of the drum 33 is under control of the line finding and line selecting mechanism which will be described in detail later. Printing on the card is effected by the type bars 96, the position of each of which when printing takes place is controlled by one of the magnets 103. These magnets are energized at times determined by the data sensed from the punched cards, that is, they are operated under control of sensing brushes 32a (Fig. 1a) of the primary feed. When printing on a particular card has been completed, the drum 33 rotates to feed the card into the grip of rollers 67, which deliver the card to the stacker, correct stacking being assured by the combined action of the stacker plate 72 and the pusher plate 71.

The feeding and stacking mechanism for the punched cards in Fig. 1a is similar to that for the blank cards, with the exception of the drive controlling rotation of drum 33a. Since the two feeding mechanisms are required to run in synchronism, the shaft 12 (Fig. 2) is extended to form the shaft 12a (Fig. 2a) carrying the gearing necessary for driving the punched card feed. The cam 548 is driven from shaft 12a. A roller 47a bears on the cam surface under the action of a spring 49a and consequently as the cam rotates, the rack 46a, to which roller 47a is attached, is driven with a reciprocating motion. The movement of the rack causes gear 45a, which is freely mounted on the same shaft 44a as drum 33a, to oscillate. The gear 45a carries an arm 50a on which is a pawl 51a capable of engaging with teeth of a ratchet wheel 534a. The ratchet 534a is secured to the same shaft 44a as drum 33a, so that the motion of gear 45a in a clockwise direction is transmitted to the drum.

*Line control mechanism*

The line control mechanism on the blank card feed performs two separate and independent functions: (1) Determining the position on the card occupied by the first line of printing; and (2) determining the spacing between successive lines of printing.

Figure 2:
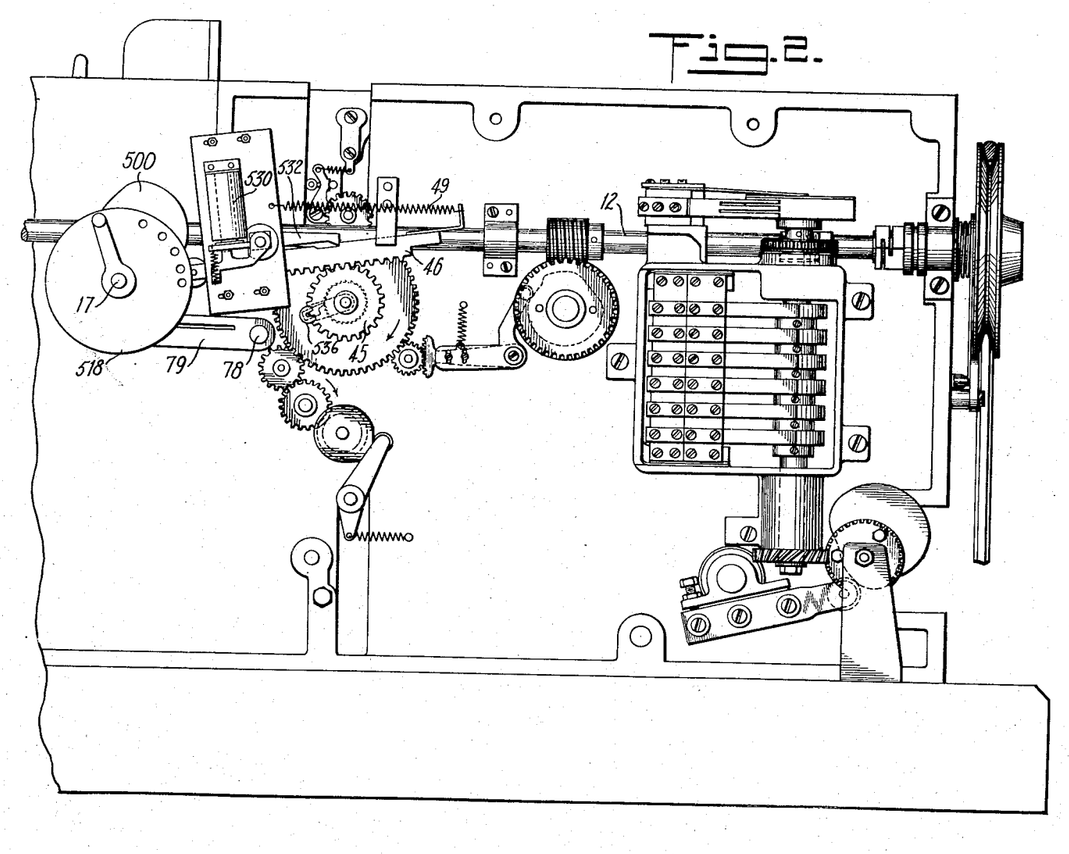
Figs. 2 and 2a, taken together, constitute a rear elevational view of the complete machine.
Figure 2A:
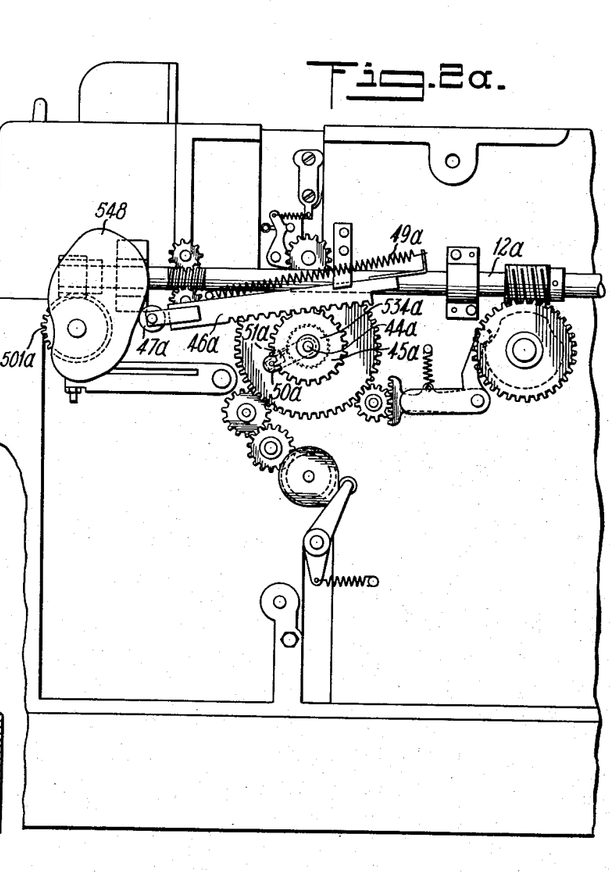

The first function is governed by two adjustments, one coarse and one fine, by which the position of the shaft 17 may be shifted relative to the cam 500, which drives the rack 46 (Fig. 2). The other end of the shaft 17 is connected through an eccentric linkage to the arm 21 (Fig. 1) which causes the reciprocatory movement of the picker knife 23. Thus the movement at which the card begins to feed from the hopper can be adjusted in relation to the time at which drum 33 begins to rotate, so altering the position of the card will have reached when drum 33 stops due to the dwell of cam 500 and in consequence altering the position on the card in which printing will take place.

The mechanism for carrying out this adjustment will now be described in more detail in conjunction with Figs. 2 to 6. Freely mounted on shaft 17 is a gear 501 which meshes constantly with a worm wheel (not shown) on the main driving shaft 12. On one face of gear 501 is mounted an arm 502 free to pivot about the stud 503. The arm is normally constrained by a spring 504 which is secured at the other end to the gear 501. Further limitation on the movement of arm 502 is effected by the stud 544 secured to arm 502, which fits loosely in the elongated slot 506 in gear 501. Also free on shaft 17 is a bushing 509 which is formed with a shoulder 512. Rivets 511 pass through a disc 510, the shoulder 512 of the bushing, the cam 500, a brake cam 507 and a disc 508, so that they are secured and rotate together. The disc 508 has two notches 513 in its periphery, either of which may be engaged by a projection 505 on the arm 502. Thus the cam 500 and plate 510 attached to it may be set in one of two positions relative to gear 501, depending upon which notch 513 is engaged by the projection 505. Since the gear 501 is in constant mesh with the worm on the main drive shaft 12, this provides a coarse adjustment relative to the timing of the rest of the machine. The movement of the cam permits the comparatively short dwell to be maintained in sufficiently correct position in relation to the printing time.

A disc 514 (Fig. 3) slips over the end of the bushing 509 and is secured to disc 518 by bolts in threaded holes 592. An arm 515 (Figs. 3 and 6) is pivotally attached to a disc 517 by a stud 524 and is constrained by a spring 522. The disc 517 and a disc 518 are secured together and are freely mounted on shaft 17. Secured to one face of the disc 517 is an arm 516. Disc 514 has an extension bushing with a small slot 525 in which a projection 523 on the arm 515 may engage. The disc 518 is provided with a series of holes 520 into which a spring loaded stud 521 on the arm 519 may fit. The arm 519 is secured to the end of shaft 17.

Figures 3, 4, 5, 6:
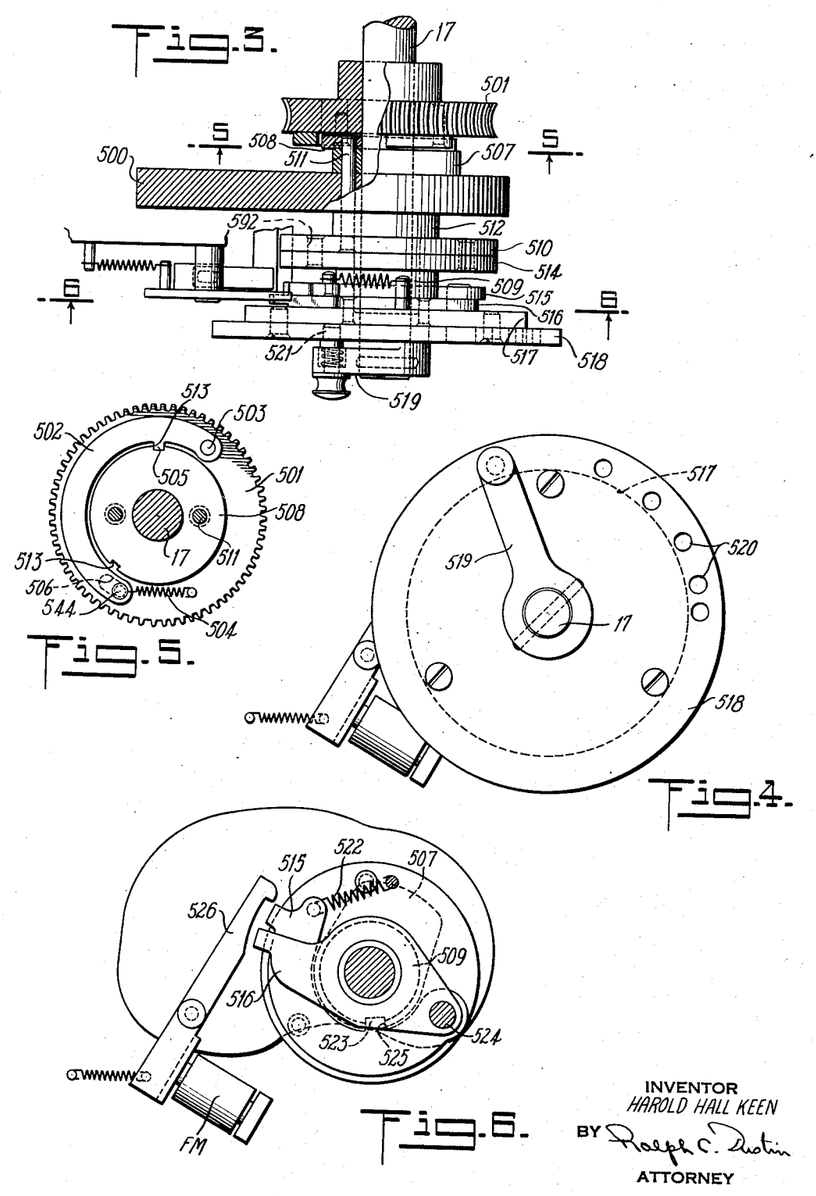
Fig. 3 is a plan view, partly in section, of the line selecting mechanism.
Fig. 4 is an elevational view of the line selecting mechanism looking at it from the lower end of Fig. 3.
Figs. 5 and 6 are vertical sectional views taken on the planes of the lines 5—5 and 6—6 of Fig. 3.

When the arm 515 is engaged with the bushing of the disc 514, the gear 501 is able to transmit the drive from the main shaft 12 through the intermediate linkage to the disc 518. Since the arm 519 is locked in one of the holes 520, the drive is further transmitted to the shaft 17 and thus to the picker knife 23. With the projection 505 in one of the notches 513, a coarse setting of the relationship between the timing of the picker knife 23 and the remainder of the machine is obtained, which may be finely adjusted by setting the arm 519 in one of the six holes 520. Thus the first printing line may be brought to any one of six positions in, say, the top half of the card. By engaging the projection 505 with the other notch 513, the printing line may be moved to the lower half of the card, with again six positions of fine adjustment available by moving the arm 519.

An arm 526 operated under control of a feed clutch magnet FM (Fig. 6) may engage with the end of arm 515. When arm 515 is thus held a further small rotation of disc 514 occurs so that spring 522 is extended, and the disc 517 with the arm 516 move clockwise (as shown in Fig. 6). The effect of the disc 517 moving clockwise is to lower the pivot point 524, so that projection 523 on arm 515 is drawn clear of the slot 525 in the bushing of disc 514. The movement of the disc 517 is limited by engagement of the arm 516 with the arm 526. Thus, while the arm 515 is held by arm 526, discs 517 and 518 are disconnected from the drive by the gear 501, so that in effect 515 and 514 operate as the two elements of a magnetically controlled clutch between the gear 501 and shaft 17. When arm 515 is released, its projection 523 again engages in slot 525 and drive is resumed.

The brake cam plate 507 (Fig. 3) through an arm 79 (Fig. 2) causes partial rotation of shaft 78 (Fig. 1). Thus, at the appropriate time, the brake 77 is impelled against the drum 33 to prevent overrun due to the momentum of the moving parts.

Figure 7:
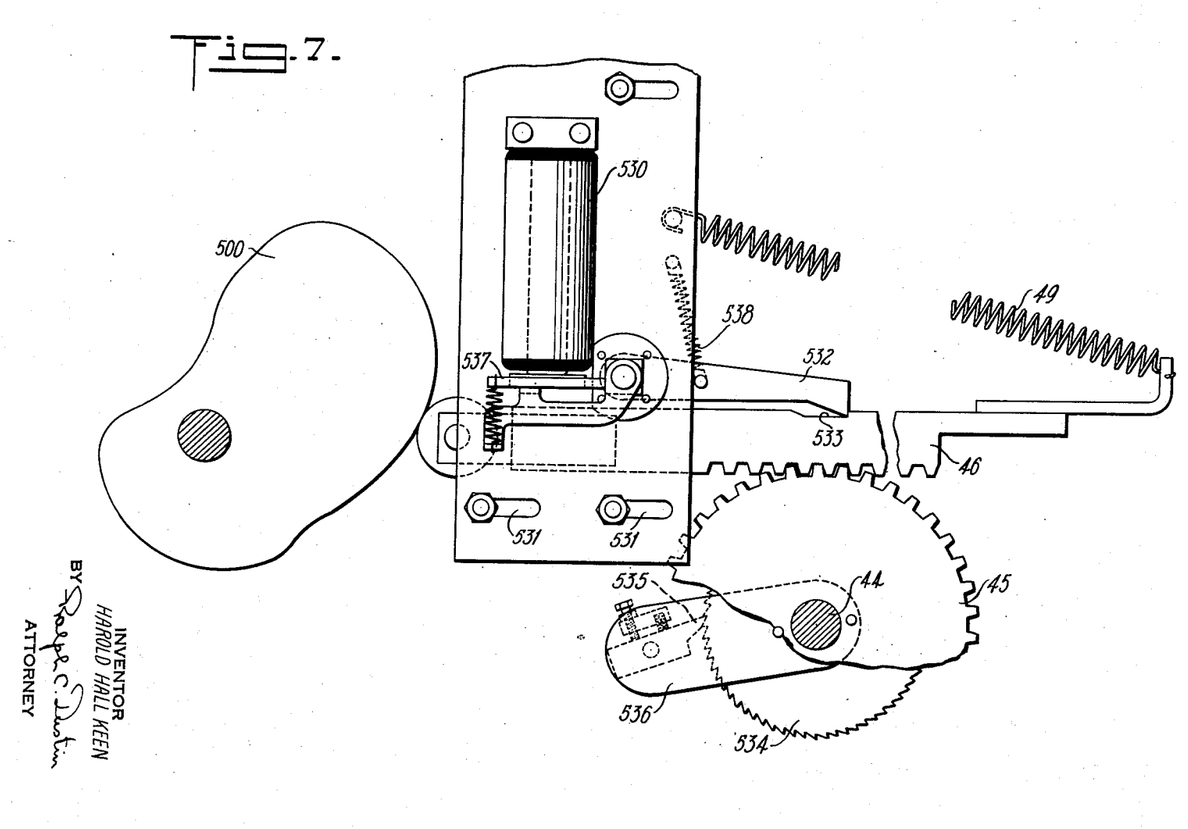
Fig. 7 is a detail view of the line spacing mechanism.

The line spacing mechanism will now be described with particular reference to Fig. 7. The gear 45, which is driven by the rack 46, is freely mounted on shaft 44 which also carries the drum 33 (Fig. 1). The arm 536 secured to gear 45 carries a sprung ratchet mechanism 535 which engages with the ratchet wheel 534 secured to shaft 44. Thus the reciprocatory motion of the rack is converted to uni-directional rotation of the shaft 44.

A magnet 530, mounted on a suitable base plate, controls the movement of an arm 532 which is linked to the magnet armature 537. This arm is normally held by a spring 538 in a raised position and is movable on energizing the magnet 530 to a lowered position where it engages a notch 533 on the upper side of the rack. Consequently, the movement of the rack under the tension of its return spring is limited by engagement of the arm with the notch 533, so that on the next rotation of the cam 500 it can give the rack only a limited movement in the forward direction. This limited drive is communicated to shaft 44 and hence drum 33 moves the card at the printing position only a small amount, equal to the required line spacing.

In order to provide for varying the line spacing, the magnet base plate is provided with elongated mounting holes 531. The complete magnet assembly and arm 532 may thus be locked in various positions relative to the rest position of rack 46. In Fig. 7 the base plate is shown in the extreme right-hand position so that arm 532 engages notch 533 early in the return stroke of the rack and the rack movement is consequently a minimum. Closest line spacing is given in this position and may, for example, be ten lines per inch. By shifting the plate towards the left, the free movement of the rack is increased and the line spacing may be increased, for example to ten lines per two inches in an intermediate position and ten lines per three inches when the plate is in the extreme left-hand position.

A cam 540 and rack 46a similarly drive the drum 33a, but the cam is driven directly from shaft 12a through a gear 591a and the rack makes its full stroke each cycle.

*Circuit diagram and operation*

Figure 8A:
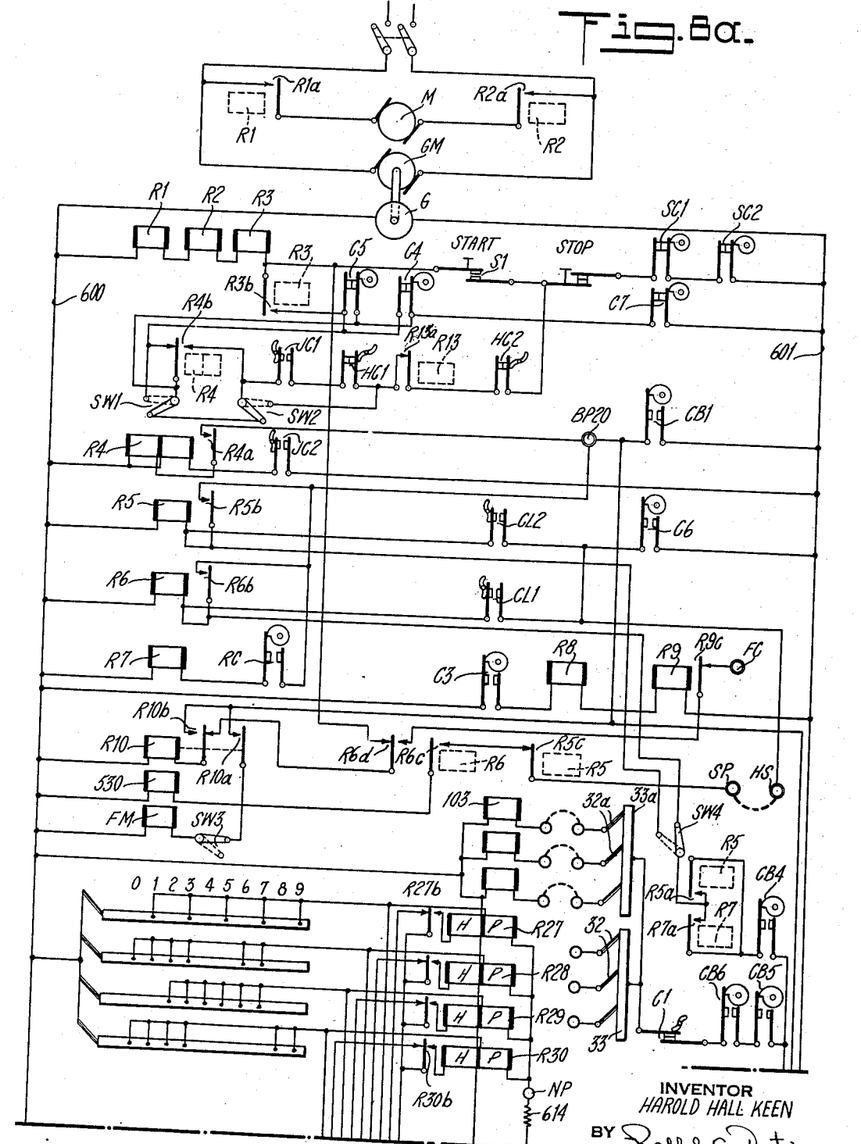
Figs. 8a, 8b and 8c arranged end-to-end constitute a circuit diagram of the machine wiring.

The functions of the various relays and contacts shown in the circuit diagram (Figs. 8a, 8b and 8c) will be explained by reference to the operation of the machine when printing data from groups of punched cards on to single blank cards.

For this purpose, blank cards are placed in the printing feed hopper and the punched cards to be interpreted in the reading feed hopper. The coarse adjustment on the line positioning mechanism is set for printing on the top half of the card and the fine adjustment in the first hole 520 so that printing of the first line occurs near the top edge of the blank card. If it is known beforehand that each group of punched cards contains only a few cards or there is data already punched on the card, it may be desirable to place the fine adjustment in the second or third hole in order to commence printing a little lower down on the card. The base plate carrying magnet 530 is adjusted for close line spacing, that is, ten lines per inch.

When the main switch is closed, the supply voltage is applied to the motor GM which drives the generator G to supply power to the control circuits of the machine. The start key is then closed so that a circuit is made from line 600 through relays R1, R2 and R3, start key contact, stop key contact (normally closed), contacts SC1 and SC2 (normally closed) to line 601, thus energizing relays R1, R2 and R3. Relay R1 closes its contacts R1a and relay R2 closes its contacts R2a, thus connecting the machine driving motor M across the main supply lines. The motor M drives shaft 12 through a pulley and belt (Fig. 2).

The above mentioned contacts SC1 and SC2 are two of a number of safety contacts fitted to the machine to prevent incorrect operation. The contacts SC1 and SC2 are fitted one in each stacker so that if an excessive number of cards accumulate in the stacker, due to inattention on the part of the operator, the contacts will open and stop the machine. Safety contacts HC1 and HC2 are fitted one in each feed hopper and remain closed as long as the hopper contains cards. Jam contacts JC1 and JC2 are operated by cards as they pass through the ejector rolls into the stacker, so that if cards do not feed properly, an indication is given by stopping the machine.

The rack 46 (Fig. 2) will be in its fully returned position at the beginning of the machine operation and, in consequence, rack contacts RC (not shown in Fig. 2) will be open. The switches have been set with SW1 and SW2 in the lower position. As the start key is maintained depressed, a card is fed forward from each of the two hoppers. The forward movement of the rack in feeding the blank card has closed the rack contacts RC which remain closed until the blank card is ejected and another fed in.

The blank card feed is called by the following circuits. Relay R10 is energized through the circuit from line 600, relay R10, contacts R10b (normal), contacts R6a (normal), start key contacts (closed), and contacts SC1 and SC2 to line 601. Contacts R10b then close and a new circuit to hold R10 is through R10b (shifted) and CB1 to line 601, until CB1 breaks. When R10 is energized, the feed magnet FM is energized through the circuit from line 600, magnet FM, switch SW3 (closed), contacts R10a (shifted), and cam contacts CB1. The magnet FM operates the arm 526 (Fig. 6) to disengage from arm 515 and thus engage the drive to shaft 17. The magnet FM will have been deenergized before the shaft 17 has completed one revolution and, consequently, arm 515 will once more be engaged and the drive de-clutched.

The contacts CL1 (Fig. 1a) operated by the card lever in the primary feed will be closed by the passage of the first card, thus operating relay R6 through cam contacts C6. Contacts R6b will close to provide a holding circuit for R6 from line 600, relay R6, contacts R6b (shifted), cam contacts CB1 to line 601. Since the make time of CB1 overlaps the break time of the card lever contacts CL1, relay R6 will remain energized until the circuit is broken by CL1 not closing at the appropriate time in the cycle, due, for example, to there being no feed of a card. Contacts R6d are held shifted, so that R10 will not be energized by the already traced circuit, and the secondary card feed clutch magnet FM will not be called. So far, one card has been delivered from each feed. The punched card has been sensed and the blank card is at the printing position.

Although a print magnet is required for each type bar, for purposes of clarity, the various circuits have not been shown in full, so that, for example, only three print unit magnets 103 have been shown. However, the plug connections and operation for each column is identical, so that the connections for one column only will be described.

If alphabetic data expressed by such a code as is shown in U. S. Patent No. 1,926,883 is being interpreted, then two impulses will be sensed, one in either the X or Y position and one in the numeric position from 0 to 9. If, for example, the punching is X, 7, then the sensing brushes will make contact with the sensing roll at X time and at 7 time. At X time a circuit will be made from line 601, cam contacts CB1, contacts R6b (shifted), switch SW4 (upper position), contact R7a (shifted), cam contacts CB4, CB5, CB6 and C1, primary sensing roll 33a, primary reading brushes 32a, plug connection, magnet 103 to line 600. The energization of the magnet 103 causes the zoning pawl of the type bar to be set. A similar circuit will be set up at 7 time to set the pawl, which was mechanically reset between X and 0, for the second time, thus locking the type bar in the correct printing position. A detailed description of this form of type bar setting will be found in the reference Patent No. 2,076,713.

When numerical data is interpreted, a single pulse is sensed from one of the primary reading brushes at a time corresponding to the number of the index point at which the brush senses a hole, and one of the print magnets is set up by this pulse.

If the start key is still held depressed, a second cycle will commence. A card will be fed from the primary punched card feed, but not from the blank card feed, since the relay R10 cannot be energized. However, the rack magnet 530 is energized through contacts R6c (shifted), R5c (normal), plug SP to HS, cam contacts C6 to line 601. This magnet 530 controls the return movement of the rack by interposing the arm 532 in the path of the rack. Although shaft 17 is not being driven, the cam 500 rotates every cycle so that it will drive rack 46 but only for a limited distance, since the arm 532 has served to prevent the full return of the rack. This distance is such as to give a movement to the blank card equal to one line space.

The first primary card fed will now pass between the ejector feed rolls into the stacker. In so doing, it will close the primary jam contact JC1. A circuit will then be made from line 600, relays R1, R2 and R3, contacts R3b, contacts R4b (normal), switch SW1, switch SW2, contacts JC1 (now closed), HC1 (closed), R13a (normal), HC2 (closed), stop key contacts, contacts SC1 and SC2 to line 601, which by-passes the start key contacts, so that the key may now be released. During the period for which JC1 is open, an auxiliary hold circuit is made through cam contacts C7 and the "on" side of R4b contacts (normal). Thus, circuits have been set up to enable primary cards to be fed successively, with automatic spacing of the blank card in the secondary feed to provide printing on successive lines.

In now becomes necessary to insure that when the last card of a group has been sensed, the blank card is ejected and another fed in. The last card of each group is designated by a Y punched in any desired column. A plug connection is made from FC to this column of the primary advanced reading brushes. Thus, when the last card of the group passes the advanced reading brushes and the Y is sensed, a circuit may be traced as follows: line 601, cam contacts CB1, contacts R6b (closed), switch SW4 (in upper position), contacts R7a (closed), cam contacts CB4, cam contacts CB5, cam contacts CB6, primary advanced reading brush, plug point FC, contacts R9c, contacts R6d (shifted), contacts R10b (normal), relay R10, to line 600. Contacts R10a will close and set up the feed magnet FM through CB1, and R10 will also be held through R10b (shifted) and CB1. Thus, arm 515 (Fig. 6) will be released, so that when the disc 514 has rotated sufficiently far, the notch 525 will engage the projection 523 and shaft 17 will be given a single revolution, since R10 and magnet FM will be deenergized when CB1 opens. The blank card feeding from the hopper will close card lever contacts CL2, thus setting up relay R5, which will hold through its own contacts R5b and cam contacts CB1. The contacts R5c will open, thus preventing the energization of the rack magnet 530 through C6 and so allowing the rack to make a full movement. CL2 will not close on the next cycle, so R5 will drop off when CB1 opens and magnet 530 will continue line-by-line feeding.

When the blank card feeds into the hopper, the contacts JC2 will close energizing R4, which will hold on for one cycle through contacts R4a and CB1. While this relay is energized, the hold circuit for relays R1, R2 and R3 is changed over to pass through contacts JC1, contacts R4b (shifted) and SW1.

When interpreting groups of punched cards on to single blank cards, the last card of each group is punched with a Y in a designation column. However, a further control circuit is provided, which compares certain specified control columns in successive cards to insure that they are the same. If for any reason the Y on the last card does not cause the printed card to be ejected and a new one fed in, the control circuit will find disagreement in successive cards and will, in consequence, cause the machine to stop as an indication that an error has occurred.

In all, eight positions of control are provided, four to deal with columns containing alphabetic information and four to deal with numeric information. For convenience, only two sets of relays have been shown, one set for alphabetic information and one for numeric, but it will be appreciated that in the machine there are further additional sets similarly wired, to make up a total of eight. Assuming that a column of numeric information is to be used for control purposes, a plug connection is made from the appropriate column of "Primary Reading Brushes" to a "Numeric Plug" NP.

Assume, by way of example, that a 2 is sensed on the first card, then a circuit will be made from line 601, cam contacts CB1, contacts R6b (shifted), switch SW4 (upper position), contacts R5a (shifted), cam contacts CB4, CB5, CB6, C1, primary sensing roll and primary reading brush, plug connection, relay pick-up coils R28P, R29P and R30P, contact points on Binary Contact Breaker cam position 2 to line 600. The normally open b contacts of relays R28, R29, R30 will close establishing hold circuits through C8, the b contacts and coils R28H, R29H, R30H. The a contacts of these relays will also close, energizing relays R50, R51 and R52 through contacts R28a, R29a and R30a, and cam contacts C2. The relays R50, R51 and R52 then establish hold circuits through their own b contacts and cam contacts CB1. Before the next card is sensed, the relays R28, R29 and R30 will have been de-energized by the opening of C8 and C2 cam contacts, but relays R50, R51 and R52 will be held energized by CB1. If a 2 is sensed on the next card, R28, R29 and R30 will be set up once more. In addition, there will be a circuit from the numeric plug NP, through a resistance 614, contacts R7b (shifted), plug connection, relay R13 to line 600. This circuit does not exist for the first card since relay R7 is not yet operated. However, a shunt circuit across relay R13 is made as follows: line 600, binary contact commutator in position 2, contact R49c (normal), contacts R51b, R50d and R52a (all shifted), to resistance 614. This shunt circuit prevents operation of relay R13. If a 3 had been sensed on the second card, no shunt circuit through position 3 of the binary contact commutator and the chain of contacts would have existed to prevent operation of R13. In that case, R13 would have been held through its b contacts, an indicator lamp S2 and the normally closed reset key contacts. The contacts R13a would have opened to break the hold circuit for the motor control relays R1, R2 and R3, thus stopping the machine. The relay R13 is deenergized by depressing the reset key and the machine may then be restarted, as already described, after the error has been corrected.

Figure 8B:
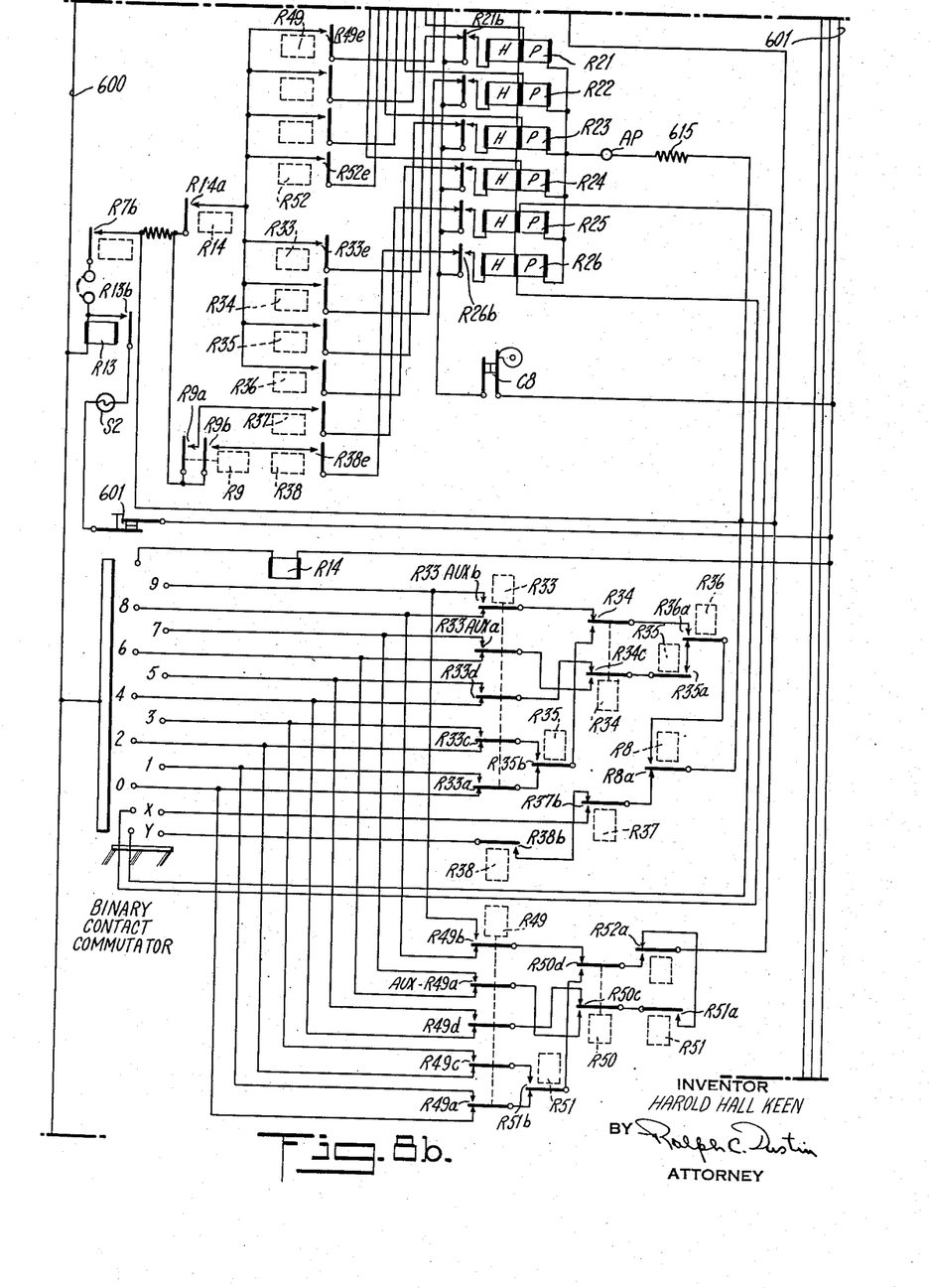
Figure 8C:
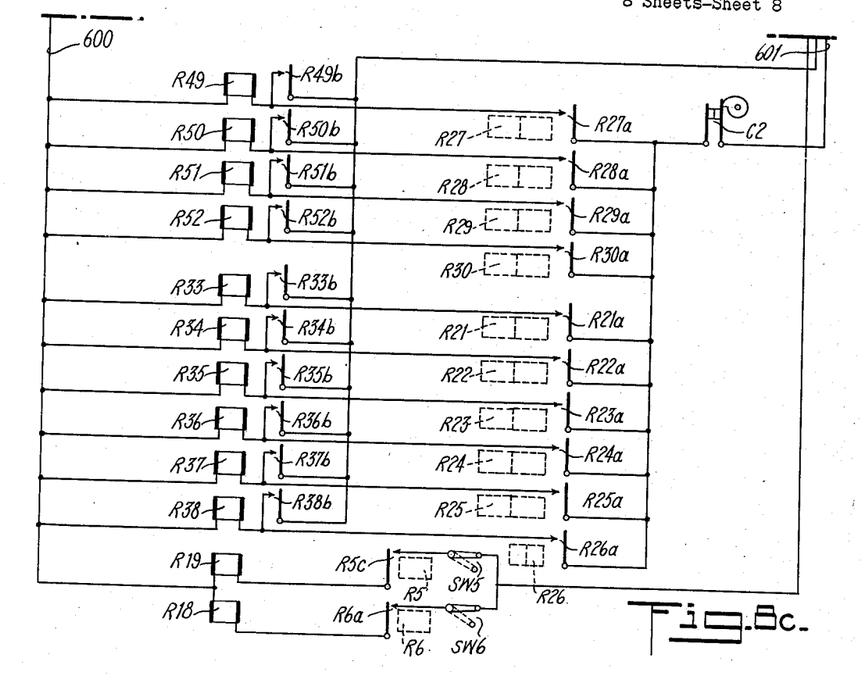
Figure 9:
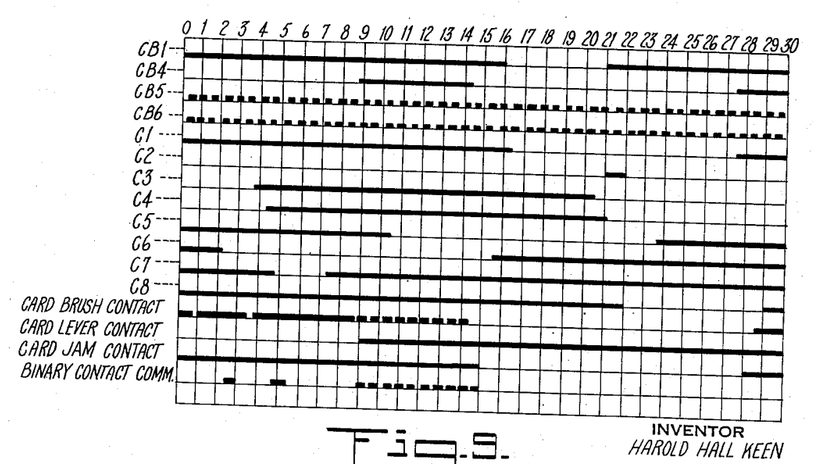
Fig. 9 is a time chart.

The operation of the alpha control section may be traced through in a similar manner to the numeric, the main difference being that additional relays are required to register the X or Y that will occur in combination with a numeric value. Under alpha control, a plug connection is made from the primary reading brush 32a of the appropriate column to an alpha plug AP (Fig. 8b). Certain combinations of the relays R21 to R26 (the combination depending upon the letter which is employed for control purposes) are then energized. The a contacts of these relays establish circuits for energizing relays R33 to R38, and the b contacts of the latter relays complete holding circuits. The AP plug is connected through a resistance 615 to the contacts R7b so that a circuit is completed through the relay R13 when the reading brush senses a perforation at the X, Y or any one of the numeric index positions. The pick-up windings of the relays 25 and 26 are connected directly to contacts in X and Y positions on the binary contact commutator so that a sensing of a perforation at one of these index positions will result in a short-circuiting of the relay R13 through the commutator and one or the other of contacts R37b, R38b and contacts R8a. When a perforation at one of the index points 1 to 9 is sensed, a circuit is established through the commutator and contacts controlled by relays R33 to R36 in the same manner as when operating under numeric control. If the combination of perforations changes, then the setting of the relays will be incorrect for at least one of the points, and the relay R13 will be energized to effect an opening of its a contacts for breaking the circuit through the relays R1 and R2 to stop the machine.

Should an unpunched column follow one containing some numeric value, then the operation of the numeric control described above will be slightly different. None of the relays R27, etc., will have been set up and there will be no impulse from the sensing brushes to energize relay R13. However, at 10 time, the relay R14 will be energized through the "Binary Contact Commutator" and close its contacts R14a. If, for example, a 2 had been sensed on the previous card, relays R50, R51 and R52 will still be energized. A circuit is then made from line 600, relay R13, plug connection, contacts R7b (shifted), resistance, contacts R14a (shifted), contacts R50e (shifted), contacts R28b (normal), cam contacts C8 to line, so that relay R13 is energized and the motor hold circuit broken. Each of the e contacts is connected to the appropriate b contacts of the relays R21 to R26 and R27 to R30, as indicated, thus R33e to R21b, R34e to R22b, etc., so that a number of parallel circuits are made across the e contacts of all the relays R33 to R38 and R49 to R52 which may have been energized.

By suitably altering the switches and plug connections, the machine may transfer data from each punched card on to a separate blank card. The settings are as follows: SW1 lower position, SW2 lower position, SW3 upper position, SW4 upper position, and FC to HS. The hold circuit for relays R1, R2 and R3 is now placed under the combined control of contacts JC1 and R4b, which latter is operated by the closure of JC2. By the connection between FC and HS the relay R10 may be set up each cycle through cam contacts C6, so that the feed clutch magnet FM will also be operated every cycle.

In order further to check that all cards have actually been interpreted on to separate blank cards, two Veeder counters may be brought into operation by energizing the magnets R18 and R19. The switches SW5 and SW6 (Fig. 8c) are closed and when card feed commences, the contacts R5c and R6a are also closed. Since one counter is connected to the primary feed and one to the secondary feed, a check on the total number of cards fed from either feed may be readily made.

By setting the machine in the following manner the control devices associated with the primary card feed may be rendered ineffective. Switches SW1, SW2 and SW3 are set in the upper position, SW4 is set in the lower position. A plug connection is made from FC to HS. The secondary reading brushes 32 are wired to the print magnets, and punched cards placed in the secondary feed will each have the data interpreted upon itself, that is, the machine may be used as an interpreter of the usual type. Further, by combining the functions already described, it is possible to place punched cards in both feeds and to have data printed upon the cards in the secondary feed which is derived partly from primary cards and partly from secondary cards.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indicated by the scope of the following claims.

What is claimed is:

1. A machine for printing on blank cards the data derived from perforated cards comprising, in combination, means for sensing perforations in said perforated cards, means for advancing said perforated cards past said sensing means one at a time, adjustable members for printing data upon the blank cards, means controlled by said sensing means for adjusting said print members, means for feeding said blank cards to positions for printing by said print members, said feeding means including a feed roll, means for intermittently rotating said feed roll, said last mentioned means including a gear, means for transmitting rotating movements of said gear in only one direction to said feed roll, a rack operatively engaging said gear, a cam having a cam surface engageable with said rack for moving the latter in a direction to effect rotation of said feed roll, means for yieldingly urging said rack toward said cam surface, and means engageable with said rack after it is first actuated by said cam for limiting its return movement.

2. The machine of claim 1 in which said means for intermittently rotating said feed roll includes a gear, means for transmitting rotating movements of said gear in only one direction to said feed roll, a rack operatively engaging said gear, a cam having a cam surface engageable with one end of said rack for moving the latter in a direction to effect rotation of said feed roll, means for yieldingly urging said rack toward said cam surface, a pawl engageable with said rack for limiting its movement toward said cam, and means including an electromagnet for controlling the operation of said pawl.

3. The machine of claim 1 in which said means for intermittently rotating said feed roll includes a gear, means for transmitting rotating movements in only one direction to said feed roll, a rack operatively engaging said gear, a cam having a cam surface engageable with one end of said rack for moving the latter in a direction to effect rotation of said feed roll, means for yieldingly urging said rack toward said cam surface, a pawl engageable with a shoulder on said rack after a predetermined movement of the latter by said cam for limiting movement of the rack toward the cam, and means including an electromagnet energized under the control of said sensing means for positioning said pawl relative to said rack.

4. The machine of claim 1 in which said means for intermittently rotating said feed roll includes a gear, means for transmitting rotating movements in only one direction to said feed roll, a rack operatively engaging said gear, a cam having a cam surface engageable with one end of said rack for moving the latter in a direction to effect rotation of said feed roll, means for yieldingly urging said rack toward said cam surface, a pawl engageable with a shoulder on said rack after a predetermined movement of the latter by said cam for limiting movement of the rack toward the cam, means including an electromagnet energized under the control of said sensing means for positioning said pawl relative to said rack, and adjustable means supporting said pawl and said electromagnet for varying the point at which the movement of said rack toward said cam is limited.

5. A machine for printing on blank cards the data derived from perforated cards comprising, in combination, means for sensing perforations in said perforated cards, means for advancing said perforated cards one at a time past said sensing means, adjustable members for printing data upon said blank cards, means controlled by said sensing means for adjusting said print members, means for feeding said blank cards to positions for printing by said print members, said feeding means including a feed roll, means for intermittently rotating said feed roll, a picker for advancing blank cards to said feed roll, means for reciprocating said picker so as to advance blank cards, said reciprocating means being adjustable manually to regulate the operation of said picker so as to advance the card to said feed roll at different points in its rotating movements, a clutch mechanism for controlling the operation of said reciprocating means, and means controlled by said sensing means for regulating said clutch mechanism.

6. A machine for printing on blank cards the data derived from perforated cards comprising, in combination, means for sensing perforations in said perforated cards, means for advancing said perforated cards one at a time past said sensing means, adjustable members for printing data upon said blank cards, means controlled by said sensing means for adjusting said print members, means for feeding said blank cards to positions for printing by said print members, said feeding means including a feed roll, means for intermittently rotating said feed roll, a picker for advancing blank cards to said feed roll, means for reciprocating said picker so as to advance blank cards, said reciprocating means including a driving member, a clutch mechanism for connecting said picker in driven relation with said driving member, means for holding said clutch mechanism normally disengaged, a magnet operable when energized to effect an engagement of said clutch mechanism, and means for energizing said magnet upon a sensing of a perforation at a predetermined location in a card, said reciprocating means operating upon engagement of said clutch to effect a single reciprocation of said picker.

7. A machine operable in cycles for printing on a blank card the data derived from perforated cards comprising, in combination, means for sensing perforations in said perforated cards, means for advancing one of said perforated cards during each machine cycle past said sensing means, adjustable members for printing data upon said blank card, means controlled by said sensing means for adjusting said print members, means for feeding said blank card to positions for printing by said print members, said feeding means including a feed roll, a card picker, means for reciprocating said picker to advance said blank card to said feed roll, said picker reciprocating means including a clutch mechanism, means for normally holding said clutch mechanism disengaged, means for engaging said clutch mechanism to effect a single reciprocation of said picker, and means for intermittently rotating said feed roll, said last mentioned means being adjustable so that the rotating movements of said feed roll take place during different portions of each machine cycle.

8. The machine of claim 7 in which said picker reciprocating means includes a clutch mechanism, means for normally holding said clutch mechanism disengaged, a magnet operable when energized to effect an engagement of said clutch mechanism, means for energizing said magnet until a card is advanced by said picker, and means for energizing said magnet under the control of said sensing means.

9. A machine operable in cycles for printing on blank cards the data derived from perforated cards comprising, in combination, means for sensing perforations in said perforated cards, means for advancing one of said perforated cards during each machine cycle past said sensing means, adjustable members for printing data upon said blank cards, means controlled by said sensing means for adjusting said print members, means for feeding one of said blank cards to a position for printing and advancing it step-by-step to different line printing positions as said perforated cards are sensed, means operable upon the sensing of predetermined perforations for ejecting said one of said blank cards and feeding another of said blank cards to a position for printing, means for comparing control data on successive cards, and means operable when said control data fails to compare and said predetermined perforations have not been sensed, for stopping the machine.

HAROLD HALL KEEN.

References Cited in the file of this patent

UNITED STATES PATENTS

| Number | Name | Date |
|---|---|---|
| 1,909,548 | Pierce | May 16, 1933 |
| 2,016,709 | Eichenauer | Oct. 8, 1935 |
| 2,076,713 | Ford | Apr. 13, 1937 |
| 2,131,967 | Peropat | Oct. 4, 1938 |
| 2,157,980 | Daubmeyer | May 9, 1939 |
| 2,185,188 | Flanigan | Jan. 2, 1940 |
| 2,274,088 | Mueller | Feb. 24, 1942 |
| 2,359,680 | Roth | Oct. 3, 1944 |
| 2,364,942 | Bradt | Dec. 12, 1944 |